United States Patent [19]

Aoyama et al.

[11] Patent Number: 4,670,509
[45] Date of Patent: Jun. 2, 1987

[54] VINYL CHLORIDE RESIN COMPOSITION HAVING IMPROVED WEATHER RESISTANCE AND IMPACT RESISTANCE

[75] Inventors: Taizo Aoyama, Himeji; Toshihiko Hasegawa, Hyogo; Hideki Hosoi, Kobe, all of Japan

[73] Assignee: Kanegafuchi Kagaku Kogyo Kabushiki Kaisha, Osaka, Japan

[21] Appl. No.: 808,150

[22] Filed: Dec. 12, 1985

[30] Foreign Application Priority Data

Dec. 13, 1984 [JP] Japan ................... 59-264157

[51] Int. Cl.$^4$ ............... C08L 27/06; C08L 51/04
[52] U.S. Cl. ....................... 525/85; 525/81; 525/82; 525/902
[58] Field of Search .............. 525/85, 902, 82

[56] References Cited

U.S. PATENT DOCUMENTS

| | | | |
|---|---|---|---|
| 3,678,133 | 7/1972 | Ryan | 260/876 |
| 3,886,232 | 5/1975 | Tanaka et al. | 525/902 |
| 3,959,408 | 5/1976 | Yusa et al. | 525/902 |
| 3,994,991 | 11/1976 | Okami et al. | 525/85 |
| 4,129,608 | 12/1978 | Murayama et al. | 525/85 |
| 4,220,734 | 9/1980 | Kosugi et al. | 525/85 |
| 4,229,549 | 10/1980 | Usami et al. | 525/85 |
| 4,289,823 | 9/1981 | Arkens | 525/902 |

Primary Examiner—Carman J. Seccuro
Attorney, Agent, or Firm—Armstrong, Nikaido, Marmelstein & Kubovcik

[57] ABSTRACT

A vinyl chloride resin composition having improved weather resistance and impact resistance which contains, as a modifier, a graft copolymer which is prepared by graft-polymerizing 50 to 15 parts by weight of a monomer component composed of mainly methyl methacrylate on 50 to 85 parts by weight of a cross-linked alkyl acrylate polymer so that 30 to 90% by weight of the monomer component is graft-polymerized and, then, the remaining portion of the monomer component is graft-polymerized in the presence of 0.1 to 5% by weight, based on the whole amount of the monomer component, of a copolymerizable cross-linking agent, the fraction extracted from said graft polymer with methyl ethyl ketone having a specific viscosity of at least 0.6 as measured in a concentration of 0.1 g/100 cc in acetone at 30° C. The composition has a reduced die swelling and provides shaped articles having excellent weather resistance and impact strength.

7 Claims, No Drawings

VINYL CHLORIDE RESIN COMPOSITION HAVING IMPROVED WEATHER RESISTANCE AND IMPACT RESISTANCE

BACKGROUND OF THE INVENTION

The present invention relates to a vinyl chloride resin composition having excellent weather resistance and impact resistance.

It is generally known that shaped articles of vinyl chloride resin have poor impact resistance. To improve the impact resistance of vinyl chloride resin, a variety of methods have been proposed.

The most representative modifier used for this purpose today is MBS resin which is prepared by graft-polymerizing methyl methacrylate and styrene, and, optionally, acrylonitrile, on a butadiene rubber polymer. However, if this MBS resin is added to a vinyl chloride resin, the resulting blend is improved in impact resistance but poor in weather resistance and if a shaped article made of such blend is used outdoors, it suffers a serious decrease in impact strength. This is the reason why MBS resin has found only limited application.

This decrease in weather resistance is mainly attributed to the ultraviolet light degradation of the butadiene unit of MBS resin. To improve the weather resistance of a modifier to be added to a vinyl chloride resin and to impart adequate impact resistance to the resulting vinyl chloride resin composition, there has been proposed a method which comprises graft-polymerizing an alkyl methacrylate, and, optionally, an aromatic vinyl compound and an unsaturated nitrile compound, onto a cross-linked acrylate rubber-like polymer containing no double bond which is composed of an alkyl acrylate and a cross-linking agent (Japanese Examined Patent Publication No. 51-28117).

When the graft copolymer thus obtained is employed as a modifier, shaped articles made of the resulting vinyl chloride resin composition have superior weather resistance. Therefore, the shaped articles have recently been used on a commercial basis in applications demanding long-term weather resistance such as window frames.

However, while the use of this graft copolymer yields a satisfactory weather resistance in shaped articles, the impact resistance of the articles is not as good as desired.

It is known that the above problem can be obviated by increasing the proportion of the rubber-like polymer in the graft copolymer. However, whereas an increased proportion of the rubber-like polymer results in greater impact strength, the agglomeration of graft copolymer particles in the course of their precipitation from the aqueous dispersion of the graft copolymer is increased to the extent that the powder state of the graft copolymer is seriously affected and it is known that, in extreme cases, the graft copolymer is available only in the form of rubbery blocks.

Thus, from the standpoint of commercial production of the graft copolymer, the usable proportion of the rubber-like polymer in the graft-copolymer has been limited by this requirement that the resulting graft copolymer must be in a good powder state.

As described above, when a graft copolymer made from a rubber-like polymer based on alkyl acrylates is used in a vinyl chloride resin composition, there is encountered the problem that increasing the proportion of the rubber-like polymer in order to improve the impact resistance of final shaped articles leads to an increased degree of agglomeration of graft copolymer particles precipitated from an aqueous dispersion so that the powder state of the obtained copolymer is seriously affected and it is difficult to obtain a copolymer in a good powder state. If, to overcome this problem, the molecular weight of the graft phase to be mentioned later is increased, there is the problem of "die swelling", i.e. the expansion of the graft copolymer-vinyl chloride resin composition which takes place at an extrusion die in the extrusion molding of the composition.

It is an object of the present invention is to solve the above problem in the production of the graft copolymer, which would otherwise occur as the result of increasing the proportion of the rubber-like polymer, to eliminate the above-mentioned drawback of "die swelling" in the extrusion molding of the resulting vinyl chloride resin composition and to impart excellent impact resistance and excellent weather resistance to shaped articles.

This and other objects of the invention will become apparent from the description hereinafter.

SUMMARY OF THE INVENTION

The present invention relates to a vinyl chloride resin composition having improved weather resistance and impact resistance which comprises 50 to 97 parts by weight of a vinyl chloride resin and 50 to 3 parts by weight of a graft polymer, provided that the total amount of both is 100 parts by weight;

said graft polymer being prepared by graft-polymerizing 50 to 15 parts by weight of a monomer component on 50 to 85 parts by weight of a rubber-like polymer, provided that the total amount of the monomer component and the rubber-like polymer is 100 parts by weight, so that 30 to 90% by weight of the monomer component is graft-polymerized and, then, the remaining portion of the monomer component is graft-polymerized in the presence of 0.1 to 5% by weight, based on the whole amount of the monomer component, of a copolymerizable cross-linking agent, the fraction extracted from said graft polymer with methyl ethyl ketone having a specific viscosity of at least 0.6 as measured in a concentration of 0.1 g/100 cc in acetone at 30° C.;

said rubber-like polymer being a cross-linked alkyl acrylate polymer comprising 80 to 100% by weight of an alkyl acrylate where the alkyl group has 2 to 8 carbon atoms, 0 to 20% by weight of at least one monomer copolymerizable therewith, and 0.01 to 5% by weight, based on 100% by weight of the monomers, of a polyfunctional cross-linking agent; and said monomer component to be grafted comprising 30 to 100% by weight of methyl methacrylate and 70 to 0% by weight of at least one member selected from the group consisting of an alkyl acrylate where the alkyl group has 1 to 8 carbon atoms, an alkyl methacrylate where the alkyl group has 2 to 6 carbon atoms, an unsaturated nitrile compound and an aromatic vinyl compound.

DETAILED DESCRIPTION

The graft polymer used in the present invention is prepared by graft-polymerizing a monomer component composed of a major amount of methyl methacrylate onto a rubber-like polymer based on alkyl acrylate. The fundamental idea is based on the finding that the powder state of the graft polymer is noticeably improved when the degree of polymerization of the polymer of the covering layer (hereinafter referred to as "graft phase") formed by graft-polymerization on the surface of the rubber-like polymer is increased, that is to say, when the specific viscosity of the extractable fraction of the graft copolymer is controlled at 0.6 or more. Thus, the present invention is predicated on the discovery that under the above conditions a satisfactory graft copolymer powder can be obtained on a commercial basis even with a large proportion of the rubber-like polymer and that as the result of an increased proportion of the rubber-like polymer, the impact resistance of the moldings obtained from the resulting vinyl chloride resin composition is noticeably improved.

It is generally known that when the degree of polymerization of the polymer of the graft phase is high, a vinyl chloride resin composition based on the graft copolymer shows the disadvantage of high die swelling ratio in the extrusion molding thereof (U.S. Pat. No. 3,678,133). Surprisingly, it has been found that if the latter half of graft-polymerization reaction is carried out in the presence of a cross-linking agent, a marked reduction in die swelling can be achieved as compared with a graft polymer having the same degree of polymerization of the graft phase as manufactured without using a cross-linking agent, notwithstanding the increased degree of polymerization of the graft phase. Thus, the present invention is based on the finding that the degree of polymerization of the graft phase can be increased for improved powder state of the graft copolymer without inducing an increase in die swelling by conducting the latter half of graft-polymerization reaction in the presence of a cross-linking agent.

If the whole amount of the monomer component to be grafted is polymerized in the presence of a cross-linking agent or the first half of graft-polymerization is conducted in the presence of a cross-linking agent, shaped articles made from a vinyl chloride resin composition based thereon will have only low impact strength. Thus, in order to decrease the die swelling ratio without sacrificing the high impact resistance, it is necessary to conduct the latter half of graft-polymerization in the presence of a cross-linking agent. More specifically, it is essential that 30 to 90 percent (percent by weight, hereinafter the same), preferably 40 to 80 percent, of the monomer component to be grafted be first polymerized and, then, the residual portion (70 to 10%, preferably 60 to 20%) of the monomer component be graft-polymerized in the presence of a cross-linking agent.

The above findings have led to the development of a vinyl chloride resin composition having excellent weather resistance and impact resistance which had not been hitherto available.

The rubber-like polymer used in the present invention is prepared using, as a main component, an alkyl acrylate.

Such alkyl acrylate is alkyl acrylates where the alkyl group has 2 to 8 carbon atoms. Typical examples of the alkyl acrylate include ethyl acrylate, propyl acrylate, isobutyl acrylate, n-butyl acrylate and 2-ethylhexyl acrylate. These alkyl acrylates may be used singly or in combination.

In the preparation of rubber-like polymer, up to 20 percent of the alkyl acrylate component may be replaced with a copolymerizable monomer having one vinylidene group or a conjugated diolefin compound.

Examples of the monomer having one vinylidene group include alkyl acrylates where the alkyl group is other than alkyl groups having 2 to 8 carbons, other acrylic acid esters, acrylic acid, metal salts of acrylic acid, acrylamide, N-substituted acrylamide, methacrylic acid and its esters, metal salts of methacrylic acid, methacrylamide, N-substituted methacrylamide, aromatic vinyl compounds and derivatives thereof, acrylonitrile, methacrylonitrile, vinyl ether compounds, vinyl ester compounds, vinyl halides and vinylidene halides. As representative examples of the conjugated diolefin compound, there may be mentioned 1,3-butadiene, isoprene, etc. These comonomers may be used alone or in combination.

The polyfunctional cross-linking agent to be copolymerized together with such alkyl acrylates include compounds having equivalent functional groups, such as divinylbenzene and polyethylene glycol dimethacrylate, and compounds having functional groups at least one of which is not equivalent to the other functional group or groups, such as allyl methacrylate and allyl acrylate. Among such polyfunctional cross-linking agents, those having functional groups at least one of which is not equivalent to the other functional group or groups are preferred because the alkyl acrylate polymer can be cross-linked with a lesser amount of the polyfunctional cross-linking agent.

The rubber-like polymer used in the present invention is prepared, for example, by a conventional emulsion polymerization method, using 80 to 100 percent of the alkyl acrylate, 0 to 20 percent of one or more other monomers copolymerizable therewith, and, based on 100 percent of the monomer component, 0.01 to 5 percent, preferably 0.5 to 5 percent, and more preferably 1 to 4 percent, of the polyfunctional cross-linking agent. When the rubber-like polymer is prepared using the alkyl acrylate alone, the polyfunctional cross-linking agent is particularly important in that it gives rise to desirable particles of cross-linked alkyl acrylate polymer. If the amount of the polyfunctional cross-linking agent exceeds 5 percent, the vinyl chloride resin composition containing the graft copolymer prepared using the rubber-like polymer will yield shaped articles having insufficient impact resistance. If the amount of the polyfunctional cross-linking agent is less than 0.01 percent, the object of using the cross-linking agent will not be accomplished.

It is preferable that the rubber-like polymer thus prepared has a greater average particle size for attaining increased impact resistance and, for practical purposes, an average particle size of not less than 1,500 Å, particularly not less than 1,700 Å is preferred. The upper limit of the average particle size is usually 3,500 Å. Various methods are available for ensuring such a controlled average particle size of rubber-like polymer and any of the known methods can be utilized. For example, a polymer having an average particle size of about 1,000 Å, which can be easily prepared in a usual manner, may be further subjected to an ordinary agglomeration treatment prior to graft-polymerization. However, it is preferable to prepare a rubber-like polymer with an average particle size of not less than of 1,500 Å by a usual seed polymerization technique, because the polymer produced by this method includes a lesser proportion of small particles which do not substantially contribute to impact resistance.

The monomer component which is to be grafted on the rubber-like polymer in accordance with the present invention must be carefully selected in order to obtain a substantial improvement in impact resistance and the compatibility thereof with vinyl chloride resin is important for achieving an improved impact resistance. It is well known that a methyl methacrylate polymer is a representative polymer compatible with vinyl chloride resin and in the present invention, too, the use of methyl methacrylate as a monomer to be grafted is essential.

Thus, the monomer component to be grafted according to the present invention is composed of 30 to 100 percent of methyl methacrylate and 0 to 70 percent of one or more monomers selected from alkyl acrylates where the alkyl group has 1 to 8 carbon atoms; alkyl methacrylates where the alkyl group has 2 to 6 carbon atoms; unsaturated nitrile compounds; and aromatic vinyl compounds. When the above comonomer is used in combination with methyl methacrylate, a monomer component composed of 30 to 97 percent of methyl methacrylate and 3 to 70 percent of the comonomer is preferably used.

If the proportion of methyl methacrylate in the monomer component to be grafted is less than 30 percent, there will not be obtained a sufficient improvement in impact resistance.

Examples of the alkyl acrylate having an alkyl group with 1 to 8 carbon atoms include methyl acrylate, ethyl acrylate and n-butyl acrylate. Examples of the methyl methacrylate an alkyl group with 2 to 6 carbon atoms include ethyl methacrylate and n-butyl methacrylate. Examples of the unsaturated nitrile compound include acrylonitrile and methacrylonitrile. A typical example of the aromatic vinyl compound is styrene. However, vinyltoluene, α-methylstyrene, etc. can likewise be employed.

As to the monomer component to be copolymerized with methyl methacrylate, it is preferable to use a monomer or monomers selected from methyl acrylate, ethyl acrylate, n-butyl acrylate, ethyl methacrylate, n-butyl methacrylate, styrene and acrylonitrile, because these monomers do not interfere with the compatibility of a methyl methacrylate polymer with a vinyl chloride resin and will contribute to the development of increased impact resistance.

To achieve an improvement in impact resistance with an increased proportion of the rubber-like polymer by improving the powder state of the graft copolymer in accordance with the present invention, it is essential to increase the degree of polymerization of the graft phase of the graft copolymer, that is to say, it is essential that the specific viscosity of the fraction extractable from the graft copolymer with methyl ethyl ketone is at least 0.6 in a concentration of 0.1 g/100 cc in acetone at 30° C. If the specific viscosity is less than 0.6, the degree of polymerization of the graft phase is too low to achieve a sufficient improvement in the powder state of the graft polymer. The amount of the extract from the graft copolymer varies depending upon the ratio of the monomer component to be grafted to the rubber-like polymer, etc. For instance, when the amounts of the rubber-like polymer and monomer component used are 75 parts (parts by weight, hereinafter the same) and 25 parts, respectively, the amount of the extract is approximately from 3 to 7% of the resulting graft copolymer.

In conducting the graft-polymerization, the whole amount of the monomer component to be grafted may be added all at once to the reaction system, or the monomer component may be added in whole or in portions, either continuously or intermittently. In order to increase the degree of polymerization of the graft phase, it is preferable to conduct the graft-polymerization by adding the whole or a major portion of the monomer component all at once and then conducting the polymerization reaction with adding small portions of a catalyst. Moreover, when two or more monomers are used as a monomer component to be grafted, all monomers may be initially mixed and then subjected to graft-polymerization, or the graft-polymerization is conducted in two or more polymerization stages with varying the proportion of the monomers within the above mentioned range. Examples of the catalyst used include peroxides such as cumene hydroperoxide.

When the degree of polymerization of the graft phase is high, the latter half of graft-polymerization should be conducted in the presence of a cross-linking agent in order to reduce the die swelling in extrusion molding. By doing so, though the reason is not clear, the die swelling is noticeably reduced as compared with the graft copolymer prepared by polymerization using no cross-linking agent to the same degree of polymerization. Furthermore, if the whole amount of the monomer component is graft-polymerized with the cross-linking agent or a portion of the monomer component is graft-polymerized with the cross-linking agent in the first half of the graft-polymerization, the impact resistance of shaped articles from the vinyl chloride resin composition containing the resulting graft polymer is not sufficient. Therefore, it is essential that a portion of the monomer component be polymerized together with the cross-linking agent in the latter half of graft-polymerization.

Thus, 30 to 90 percent, preferably 40 to 80%, of the monomer component to be grafted is first graft-polymerized and, then, the remaining portion of the monomer component (70 to 10%, preferably 60 to 20%) is graft-polymerized together with 0.1 to 5% of a copolymerizable cross-linking agent based on the total amount of the monomer component.

If the amount of the cross-linking agent is less than 0.1%, the die swelling cannot be reduced sufficiently, while the use of more than 5% of the cross-linking agent does not provide for a sufficient impact resistance, when the resulting graft polymer is blended with a vinyl chloride resin. If the proportion of the monomer component polymerized in the absence of the cross-linking agent in the first half graft-polymerization is less than 30 percent, there cannot be obtained a graft polymer capable of imparting a sufficient impact resistance to the vinyl chloride resin composition just as it is the case when all the monomer component is graft-polymerized with the cross-linking agent. If the proportion of the monomer component polymerized with the cross-linking agent in the latter half graft-polymerization is less than 10 percent, the effect of reducing the die swelling is not as great as desired.

Typical examples of the cross-linking agent mentioned above include aromatic polyfunctional vinyl compounds such as divinylbenzene; dimethacrylates such as monoethylene glycol dimethacrylate and 1,3-butanediol dimethacrylate; trimethacrylates; triacrylates; unsaturated carboxylic acid allyl esters such as allyl acrylate and allyl methacrylate; diallyl and triallyl compounds such as diallyl phthalate and triallyl isocyanurate.

The amount of the grafting monomer component with respect to 50 to 85 parts, preferably 60 to 85 parts, of the rubber-like polymer is 50 to 15 parts, preferably 40 to 15 parts, provided that the total amount is 100 parts. If the amount of the rubber-like polymer is less than 50 parts, the resulting graft polymer is poor in impact resistance improving effect and, therefore, the result is not practically satisfactory. On the other hand, if the amount of the rubber-like polymer is more than 85 parts, the resulting graft copolymr tends to undergo blocking in obtaining it from its aqueous latex so that it cannot be easily blended uniformly with a vinyl chloride resin.

The graft copolymer latex thus obtained is spray-dried, or salted out or precipitated under acidic conditions, filtered and dried. The aging inhibitor, ultraviolet absorber, etc. which are generally used in coagulation, may be added.

The obtained graft copolymer is mixed into a vinyl chloride resin to provide a composition in accordance with the present invention. The term "vinyl chloride resin" is used herein to mean not only vinyl chloride homopolymer but also copolymers containing 70% or more of vinyl chloride and 30% or less of other monomer such as vinyl acetate, and derivatives of vinyl chloride resin such as chlorinated polyvinyl chloride.

The proper ratio of the graft copolymer to the vinyl chloride resin varies depending with different applications but generally the graft copolymer is used in an amount of 3 to 50 parts to 97 to 50 parts of the vinyl chloride resin, provided the total amount is 100 parts.

The present invention is more specifically described and explained by means of the following Examples. It is to be understood that the present invention is not limited to the Examples, and various change and modifications may be made in the invention without departing from the spirit and scope thereof.

EXAMPLE 1

(A) Preparation of seeds for use in the production of rubber-like polymer

A glass reactor equipped with a thermometer, stirrer, reflux condenser, nitrogen gas inlet and monomer introduction device was charged with the following materials.

| Distilled water | 250 parts |
| Rosin potassium salt | 0.5 part |
| Sodium oleate | 0.5 part |
| Demol N | 0.2 part |
| Sodium formaldehyde-sulfoxylate (SFS) | 0.1 part |
| $Na_3PO_4.12H_2O$ | 0.45 part |
| EDTA.2Na | 0.008 part |
| Ferrous sulfate.$7H_2O$ | 0.002 part |

The mixture was heated up to 40° C. with stirring in a nitrogen gas stream, followed by addition of 5% of a monomer mixture composed of 100 parts of n-butyl acrylate, 2.0 parts of allyl methacrylate and 0.1 part of cumene hydroperoxide. Then, the remaining monomer mixture (95%) was added dropwise over a period of 4 hours. After the dropwise addition, the mixture was further reacted for 1.5 hours to carry the polymerization to completion.

The yield of the polymer was 97% and the average particle size of the latex was 900 Å.

Demol N is a naphthalenesulfonic acid-formaldehyde condensation product available from Kao Atlas Kabushiki Kaisha.

(B) Preparation of rubber-like polymer

Using the latex prepared in the above (A), the seed polymerization reaction was conducted.

Into the same glass reactor as used in the above (A) were added the following materials:

| Distilled water | 250 parts | |
| Rubber latex obtained in the above (A) | 10 | parts (as nonvolatile matter) |
| SFS | 0.1 part | |
| EDTA.2Na | 0.008 part | |
| Ferrous sulfate.$7H_2O$ | 0.002 part | |

The mixture was heated up to 40° C., followed by continuous addition of a monomer mixture composed of 90 parts of n-butyl acrylate, 2 parts of allyl methacrylate and 0.1 part of cumene hydroperoxide over a period of 4 hours. Simultaneously with addition of the monomer mixture, a 5% aqueous solution of 1 part of sodium oleate was continuously added over the same 4-hour period. After the above addition, 0.05 part of SFS was further added and the polymerization reaction was continued for 5 hours to give a rubber-like polymer latex.

The conversion rate of the monomer mixture was 98% and the average particle size of the latex was 2,000 Å.

(C) Preparation of graft copolymer

The same glass reactor as used in the above (A) was charged with the following materials and the mixture was heated at 45° C. with stirring in a nitrogen gas stream until the oxygen concentration of the aqueous dispersion was not more than 0.5 ppm.

| Rubber-like polymer latex obtained in the above (B) | 80 parts (as nonvolatile matter) |
| SFS | 0.01 part |
| EDTA.2Na | 0.01 part |
| Ferrous sulfate.$7H_2O$ | 0.005 part |

Then, the whole amount of the following monomer mixture to be grafted was added to the above mixture all at once.

| Methyl methacrylate | 16 parts |
| Methyl acrylate | 4 parts |

After the above addition, 0.0005 part portions of cumene hydroperoxide were added at one-hour intervals over a period of 6 hours so that 70% of the monomer mixture was polymerized. The total amount of cumene hydroperoxide used was 0.003 part. Thereafter, 0.25 part of allyl methacrylate as a cross-linking agent and 0.01 part of cumene hydroperoxide were added and the polymerization reaction was conducted for 3 hours. The conversion rate of the above monomer mixture was 97%.

The graft copolymer latex thus obtained was salted out and dried to give a desired graft copolymer.

The powder state of the graft copolymer was visually evaluated according to the following criteria:

O: The graft copolymer is obtained in an excellent powder state so that the graft copolymer powder can be produced on a commercial basis.

Δ: The graft copolymer is obtained in a poor powder state so that the graft copolymer powder cannot be produced on a commercial basis.

X: The graft polymer is markedly agglomerated into blocks in precipitation from an aqueous latex so that it is not obtained as a powder.

The specific viscosity of the fraction extracted from the graft copolymer was measured by the method described below. Table 1 shows the results. (Specific viscosity)

The graft copolymer was immersed in methyl ethyl ketone for 24 hours. The soluble matter was separated by centrifugation, purified by reprecipitation using methanol and then dried. The specific viscosity of the extract was measured in a concentration of 0.1 g/100 cc in acetone at 30° C.

A mixture of the graft copolymer thus obtained and other components according to the following Formulation 1 was roll-kneaded at 180° C. for 8 minutes and then compression-molded by means of a hot press at 200° C. Izod impact strength was determined by the following method. (Izod impact strength)

The Izod impact strength (kg.cm/cm$^2$) was determined in accordance with ASTM D 256-56 using test pieces with ¼" notch at 23° C. or 0° C.

| Formulation 1 | |
|---|---|
| Vinyl chloride homopolymer (average degree of polymerization: 1,000) | 100 parts |
| Graft copolymer | 8 parts (23° C.)* or 18 parts (0° C.)* |
| Tribasic lead sulfate | 2 parts |
| Dibasic lead stearate | 1 part |
| Lead stearate | 0.5 part |
| Potassium stearate | 0.5 part |

*When 8 parts of the graft copolymer was used, the Izod impact strength of the resulting shaped article was measured at 23° C. When 18 parts of the graft copolymer was used, the Izod impact strength of the resulting shaped article was measured at 0° C.

EXAMPLES 2 TO 4

The same procedures as in Example 1 were repeated except that the amounts of rubber-like polymer, monomer component and catalyst mentioned in Example 1 (C) were changed as in Table 1 to give graft copolymers. In the same manner as in Example 1, the powder state and specific viscosity of each graft copolymer and the Izod impact strength of the shaped article according to Formulation 1 were evaluated and measured. Table 1 shows the results.

A composition was prepared according to the following Formulation 2, and the extrusion thereof was carried out at a die temperature of 195° C. using a 3 mmφ die set in the following manner, and the die swelling ratio was measured. Table 1 shows the results.

| Formulation 2 | |
|---|---|
| Vinyl chloride homopolymer (average degree of polymerization: 660) | 100 parts |
| Graft copolymer | 10 parts |
| Octyltin mercaptide | 1.5 parts |
| Epoxidized soybean oil | 1.5 parts |
| Butyl stearate | 1.0 part |
| Fatty acid polyglycol ester | 0.5 part |
| (Die swelling ratio) | |

By means of the extruder of Brabender PlastiCorder made by Brabender OHG., the above composition was extruded through a 3 mmφ die set at a die temperature of 195° C. and the diameter D of the extrudate was measured. The die swelling ratio was expressed as D/Do where Do is the diameter of the product from the composition which did not contain the graft copolymer.

EXAMPLES 5 TO 9

The same procedures as in Example 1 were repeated except that the amount of rubber-like polymer, and the kind and amount of monomer component mentioned in Example 1 (C) were changed as in Table 1 to give graft copolymers. In the same manner as in Example 1, the powder state and specific viscosity of each graft copolymer and the Izod impact strength of the shaped article according to Formulation 1 were evaluated and measured. The die swelling ratio of each composition prepared according to Formulation 2 was measured in the same manner as in Examples 2 to 4. Table 1 shows the results.

COMPARATIVE EXAMPLE 1

A glass reactor was charged with the following materials and the mixture was heated at 45° C. with stirring in a nitrogen gas stream.

| Rubber-like polymer latex obtained in Example 1 (B) | 80 parts (as non-volatile matter) |
|---|---|
| SFS | 0.2 part |
| EDTA.2Na | 0.01 part |
| Ferrous sulfate.7H$_2$O | 0.005 part |

Then, the following monomer mixture to be grafted was added over a period of 2 hours.

| Methyl methacrylate | 16 parts |
|---|---|
| Methyl acrylate | 4 parts |
| Cumene hydroperoxide | 0.2 part |

After addition of 70% of the monomer mixture, 0.25 part of allyl methacrylate was added as a cross-linking agent. After completion of addition of the monomer mixture, the polymerization reaction was continued for an additional 2 hours. The conversion rate was 97%. The obtained latex was treated in the same manner as Example 1 to give a graft copolymer, and the powder state and specific viscosity of the graft copolymer were evaluated and measured.

COMPARATIVE EXAMPLES 2 TO 3

The same procedures as in Comparative Example 1 were repeated except that the amounts of rubber-like polymer and monomer component indicated in Comparative Example 1 were changed as in Table 1 to give a graft copolymer. The powder states and specific viscosities of the obtained graft copolymers and the Izod impact strength of the shaped article prepared according to Formulation 1 were measured in the same manner as in Example 1. Table 1 shows the results.

COMPARATIVE EXAMPLES 4 TO 6

The same procedures as in Examples 2 to 4 were repeated except that the cross-linking agent was not added in the production of graft copolymer. The powder states and specific viscosities of the graft copolymers were evaluated and measured in the same manner as Example 1. The Izod impact strength of each shaped article prepared according to Formulation 1 in the same manner as in Example 1 was measured. The die swelling ratio of each composition prepared according to Formulation 2 was also measured in the same manner as in Example 2. Table 1 shows the results.

polymerized with the cross-linking agent from the beginning of the graft-polymerization to give a graft co-

TABLE 1

| | Graft polymerization | | | | | | | | | |
|---|---|---|---|---|---|---|---|---|---|---|
| | Amount of rubber-like polymer (part) | Amount of monomer (part) | | | | | | Amount of cross-linking agent (part) | Amount of catalyst added at a time (part) | Total amount of catalyst (part) |
| | | MMA* | MA* | BA* | BMA* | AN* | St* | AlMA* | | |
| Ex. 1 | 80 | 16 | 4 | — | — | — | — | 0.25 | 0.0005 | 0.003 |
| Ex. 2 | 75 | 20 | 5 | — | — | — | — | 0.25 | 0.0005 | 0.003 |
| Ex. 3 | 75 | 20 | 5 | — | — | — | — | 0.25 | 0.001 | 0.004 |
| Ex. 4 | 75 | 20 | 5 | — | — | — | — | 0.25 | 0.002 | 0.006 |
| Ex. 5 | 75 | 25 | — | — | — | — | — | 0.25 | 0.0005 | 0.003 |
| Ex. 6 | 75 | 21 | — | 4 | — | — | — | 0.25 | 0.0005 | 0.003 |
| Ex. 7 | 75 | 20 | — | — | 5 | — | — | 0.25 | 0.0005 | 0.003 |
| Ex. 8 | 75 | 20 | — | — | — | 5 | — | 0.25 | 0.0005 | 0.003 |
| Ex. 9 | 75 | 20 | — | — | — | — | 5 | 0.25 | 0.0005 | 0.003 |
| Com. Ex. 1 | 80 | 16 | 4 | — | — | — | — | 0.25 | — | 0.2 ** |
| Com. Ex. 2 | 75 | 20 | 5 | — | — | — | — | 0.25 | — | 0.2 ** |
| Com. Ex. 3 | 65 | 28 | 7 | — | — | — | — | 0.25 | — | 0.2 ** |
| Com. Ex. 4 | 75 | 20 | 5 | — | — | — | — | — | 0.0005 | 0.003 |
| Com. Ex. 5 | 75 | 20 | 5 | — | — | — | — | — | 0.001 | 0.004 |
| Com. Ex. 6 | 75 | 20 | 5 | — | — | — | — | — | 0.002 | 0.006 |

| | Graft copolymer | | Resin composition | | |
|---|---|---|---|---|---|
| | Specific viscosity of extract | State of powder | Izod impact strength (kg · cm/cm$^2$) | | Die swelling ratio |
| | | | 23° C. | 0° C. | |
| Ex. 1 | 0.6 | | 150 | 130 | — |
| Ex. 2 | 0.9 | | 71 | 60 | 1.01 |
| Ex. 3 | 0.8 | | 70 | 61 | 1.01 |
| Ex. 4 | 0.7 | | 72 | 60 | 1.01 |
| Ex. 5 | 0.7 | | 68 | 58 | 1.01 |
| Ex. 6 | 0.8 | | 71 | 62 | 1.01 |
| Ex. 7 | 0.8 | | 68 | 59 | 1.01 |
| Ex. 8 | 0.8 | | 70 | 60 | 1.01 |
| Ex. 9 | 0.8 | | 69 | 61 | 1.01 |
| Com. Ex. 1 | 0.2 | X | — | — | — |
| Com. Ex. 2 | 0.2 | Δ | 70 | 60 | — |
| Com. Ex. 3 | 0.2 | | 20 | 17 | — |
| Com. Ex. 4 | 1.0 | | 70 | 58 | 1.05 |
| Com. Ex. 5 | 0.9 | | 72 | 60 | 1.04 |
| Com. Ex. 6 | 0.8 | | 71 | 60 | 1.03 |

*MMA: methyl methacrylate, MA: methyl acrylate, BA: butyl acrylate, BMA: butyl methacrylate, AN: acrylonitrile, St: styrene, AlMa: Allyl methacrylate
**The whole amount of the catalyst was used in such a state that it was dissolved in the monomer mixture.

It will be apparent from Table 1 that even if the proportion of rubber-like polymer is increased, a graft copolymer having a satisfactory powder state can be obtained by increasing the degree of polymeization of the graft phase and that the increased proportion of rubber-like polymer results in a marked improvement in impact resistance (Examples 1 to 9).

On the other hand, if the degree of polymerization of the graft phase is too low, increasing the proportion of rubber-like polymer will seriously affect the powder state so that a practically useful graft copolymer cannot be obtained (Comparative Examples 1 to 2).

Moreover, the copolymers obtained by polymerization in the presence of a cross-linking agent in the latter half of graft polymerization (Examples 2 to 9) show remarkably decreased die swelling ratios as compared with the copolymers with the same degree of polymerization produced without a cross-linking agent (Comparative Examples 4 to 6). No decrease in impact resistance is seen due to the polymerization with a cross-linking agent in the latter half of graft-polymerization.

COMPARATIVE EXAMPLE 7

The same procedures as in Example 2 were repeated except that, instead of adding allyl methacrylate as a cross-linking agent after polymerization of 70% of the monomer mixture, 0.25 part of allyl methacrylate was used in such a state that it was dissolved in the monomer component and the whole monomer component was polymerized with the cross-linking agent from the beginning of the graft-polymerization to give a graft copolymer. Thereafter, the Izod impact strength of the shaped article produced according to Formulation 1 was measured in the same manner as in Example 1. Table 2 shows the results.

COMPARATIVE EXAMPLE 8

A glass reactor was charged with the following materials and the mixture was heated at 45° C. with stirring in a nitrogen gas stream until the oxygen concentration of the aqueous dispersion was not more than 0.5 ppm.

| Rubber-like polymer latex obtained in Example 1 (B) | 75 parts (as non-volatile matter) |
|---|---|
| SFS | 0.01 part |
| EDTA.2Na | 0.01 part |
| Ferrous sulfate.7H$_2$O | 0.005 part |

Then, the following monomer mixture to be grafted was added all at once.

| Methyl methacrylate | 6.0 parts |
|---|---|
| Methyl acrylate | 1.5 parts |
| Allyl methacrylate | 0.25 part |
| Cumene hydroperoxide | 0.001 part |

After the above addition, the polymerization was conducted for 3 hours and the following monomer mixture to be grafted was further added all at once.

| Methyl methacrylate | 14.0 parts |
| Methyl acrylate | 3.5 parts |

After completion of the addition, 0.0005 part portions of cumene hydroperoxide were added at one-hour intervals so that 70% of the monomer component was polymerized, followed by further addition of 0.01 part of cumene hydroperoxide. The polymerization was continued for further 3 hours. The conversion rate of the whole monomer mixture was 97%.

In the same manner as Example 1, a graft copolymer was obtained and the Izod impact strength of the shaped article produced according to Formulation 1 was measured. Table 2 shows the results.

TABLE 2

| | Amount of rubber-like polymer (part) | Graft polymerization | | | | | Izod impact strength (kg · cm/cm$^2$) | |
| --- | --- | --- | --- | --- | --- | --- | --- | --- |
| | | Amount of monomer to be grafted (part) | | Amount of cross-linking agent (part) | Range of conversion rate (%)* | Amount of catalyst added at a time (part) | | |
| | | MMA | MA | AIMA | | | 23° C. | 0° C. |
| Ex. 2 | 75 | 20 | 5 | 0.25 | 70 to 97 | 0.0005 | 71 | 60 |
| Com. Ex. 7 | 75 | 20 | 5 | 0.25 | 0 to 97 | 0.0005 | 42 | 35 |
| Com. Ex. 8 | 75 | 20 | 5 | 0.25 | 0 to 30 | 0.0005** | 45 | 40 |

*This means the range of conversion rate where the monomer mixture was polymerized in the presence of the cross-linking agent.
**A 30% portion of the monomer mixture in which 0.001 part of the catalyst was added was initially polymerized and thereafter the remaining monomer mixture was polymerized by adding 0.0005 part portions of the catalyst at one-hour intervals.

It will be apparent from Table 2 that when the whole of the monomer component is graft-polymerized with a cross-linking agent (Comparative Example 7) or a portion of the monomer component is graft-polymerized with a cross-linking agent in the first half of graft polymerization (Comparative Example 8), it is not possible to obtain a resin composition that will yield shaped articles having an excellent impact resistance.

In addition to the ingredients used in the Examples, other ingredients can be used in the Examples as set forth in the specification to obtain susbtantially the same results.

Even though the graft copolymer used in accordance with the present invention has an increased content of rubber-like polymer, it can be available as a graft copolymer having an excellent powder state on a commercial scale. Moreover, the vinyl chloride resin composition prepared using this graft copolymer in accordance with the present invention has a low die swelling ratio, and shaped articles obtained from the resin composition have noticeably improved impact resistance.

What we claim is:

1. A vinyl chloride resin composition having improved weather resistance and impact resistance which comprises 50 to 97 parts by weight of a vinyl chloride resin and 50 to 3 parts by weight of a graft polymer, provided that the total amount of both components is 100 parts by weight;

said graft polymer being prepared by graft-polymerizing in two stages 50 to 15 parts by weight of a monomer component on 50 to 85 parts by weight of a rubber-like polymer, provided that the total amount of the monomer component and the rubber-like polymer is 100 parts by weight, the first stage of the graft polymerization being conducted without a cross-linking agent until 30 to 90% by weight of the monomer component is graft-polymerized, and the remaining portion of the monomer component being graft-polymerized in a second stage in the presence of 0.1 to 5% by weight, based on the whole amount of the monomer component, of a copolymerizable cross-linking agent, the fraction extracted from said graft polymer with methyl ethyl ketone having a specific viscosity of at least 0.6 as measured at a concentration of 0.1 g/100 cc in acetone at 30° C.;

said rubber-like polymer being a cross-linked alkyl acrylate polymer comprising 80 to 100% by weight of an alkyl acrylate where the alkyl group has 2 to 8 carbon atoms, 0 to 20% by weight of at least one monomer copolymerizable therewith, and 0.01 to 5% by weight, based on 100% by weight of the monomers, of a polyfunctional cross-linking agent; and said monomer component to be grafted comprising 30 to 100% by weight of methyl methacrylate and 70 to 0% by weight of at least one member selected from the group consisting of an alkyl acrylate where the alkyl group has 1 to 8 carbon atoms, an alkyl methacrylate where the alkyl group has 2 to 6 carbon atoms, an unsaturated nitrile compound and an aromatic vinyl compound.

2. The composition of claim 1, wherein the graft-polymerization of the monomer component is conducted so that, after the whole amount of the monomer component is charged all at once, 30 to 90% by weight of the monomer component is first polymerized and, then, 0.1 to 5% by weight, based on the whole amount of the monomer component, of the copolymerizable cross-linking agent is added and thereafter the polymerization is continued to completion.

3. The composition of claim 2, wherein the polymerization of 30 to 90% by weight of the monomer component is carried out with adding small portions of a catalyst.

4. The composition of claim 1, wherein the graft-polymerization of the monomer component is conducted so that, after the whole amount of the monomer component is charged all at once, 40 to 80% by weight of the monomer component is first polymerized and, then, 0.1 to 5% by weight, based on the whole amount of the monomer component, of the copolymerizable cross-linking agent is added and thereafter the polymerization is continued to completion.

5. The composition of claim 4, wherein the polymerization of 40 to 80% by weight of the monomer component is carried out with adding small portions of a catalyst.

6. The composition of claim 1, wherein 40 to 15 parts by weight of the monomer component is graft-polymerized on 60 to 85 parts by weight of the rubber-like polymer, provided that the total amount of the monomer component and the rubber-like polymer is 100 parts by weight.

7. The composition of claim 1, wherein the polyfunctional cross-linking agent of the rubber-like polymer is one having functional groups at least one of which is not equivalent to the other functional group.

* * * * *